United States Patent [19]
Scheffee

[11] Patent Number: 6,062,142
[45] Date of Patent: May 16, 2000

[54] AUTOIGNITION SYSTEM FOR INFLATOR DEVICES WITH SEPARATOR THAT MELTS

[75] Inventor: Robert S. Scheffee, Gainesville, Va.

[73] Assignee: Atlantic Research Corporation, Gainesville, Va.

[21] Appl. No.: 08/828,848

[22] Filed: Mar. 31, 1997

[51] Int. Cl.[7] .................................................. C06B 45/12
[52] U.S. Cl. ........................ 102/289; 102/288; 102/705; 280/741
[58] Field of Search ............................ 280/741; 102/288, 102/289, 705

[56] References Cited

U.S. PATENT DOCUMENTS

| | | | |
|---|---|---|---|
| 3,754,511 | 8/1973 | Damon et al. | 102/102 |
| 3,797,854 | 3/1974 | Poole et al. | 149/35 X |
| 3,972,545 | 8/1976 | Kurchoff et al. | 280/735 |
| 4,561,675 | 12/1985 | Adams et al. | 280/734 |
| 5,060,973 | 10/1991 | Giovanetti | 102/705 X |
| 5,153,369 | 10/1992 | Hardt | 102/705 X |
| 5,186,491 | 2/1993 | Yoshida et al. | 280/741 |
| 5,409,259 | 4/1995 | Cunningham et al. | 280/741 |
| 5,421,835 | 6/1995 | Harding | 44/452 |
| 5,443,286 | 8/1995 | Cunningham et al. | 280/741 |
| 5,533,754 | 7/1996 | Riley | 280/741 |
| 5,675,102 | 10/1997 | Hamilton et al. | 102/288 X |

*Primary Examiner*—Peter A. Nelson
*Attorney, Agent, or Firm*—Nixon & Vanderhye PC; Frank P. Presta

[57] ABSTRACT

An autoignition system for use in an inflator or method of inflating includes a separator which divides a composition capable of spontaneous combustion or autoignition so that it cannot combust until the separator is removed or altered in form. The separator is made of a material which melts at a select temperature so that autoignition will occur upon melting of the separator. The system can also use the separator or a burst disc to sensitize a desensitized spontaneous combustion mixture to achieve autoignition at a desired temperature.

34 Claims, 1 Drawing Sheet

AUTOIGNITION SYSTEM FOR INFLATOR DEVICES WITH SEPARATOR THAT MELTS

TECHNICAL FIELD

The present invention is directed to an autoignition system and its use in inflator devices and, in particular, to a system using a separator that melts at a prescribed temperature to facilitate autoignition.

BACKGROUND ART

The use of compositions that spontaneously combust or autoignite for a variety of purposes are well known. U.S. Pat. No. 5,421,835 to Harding discloses a new and improved fire starter composition which includes a liquid fuel component and a solid oxidant component retained in separation from the liquid fuel component until ready for use. The liquid fuel component is selected from the group consisting of glycerin, ethyl alcohol, isopropyl alcohol, and methanol, and mixtures thereof. The solid oxidant component is selected from the group consisting of potassium permanganate and potassium dichromate. To start a fire, a quantity of the fuel is added to a quantity of the oxidant. One object of the invention of the Harding patent is to provide a fire starter composition which takes the place of a match or other pyrotechnic material.

U.S. Pat. No. 3,754,511 to Damon et al. discloses a similar composition for a spontaneous chemical reaction, e.g. a hypergolic composition, for igniting a briquet of compressed mixed powered oxidants and reductants in a fuel unit. In particular, Damon et al. discloses, as a substitute for an electric squib, spontaneous chemical reactions such as that of glycerin and powdered potassium permanganate.

The concept of autoignition is also utilized in inflators, particularly those for air bag inflation in vehicles. Autoignition devices are typically employed in inflators so that the inflator does not malfunction or fail at elevated temperatures. The autoignition devices generally autoignite at temperatures well below those that would cause the inflator structural assembly to fail. In addition, the autoignition devices in inflators are designed to activate the inflator when a disposed automobile is to be burned out. In this way, no active chemical agents remain in the automobile. The autoignition devices are also designed to ignite when the inflator performs in its intended function.

U.S. Pat. No. 5,186,491 to Yoshida et al. shows a typical gas generation device for a vehicular passenger protecting system which includes an autoignition device. In this patent, a smokeless powder having a four-second ignition temperature of 175° C. is used as the autoignition composition.

U.S. Pat. No. 4,561,675 to Adams et al. discloses another autoignition device. In this patent, the autoignition material is preferably a granular mixture of 25% by weight of boron and 75% of potassium nitrate plus or minus 10% of lead azide. The autoignition composition may also be any granule, powder other material which is stable for a long duration at temperature up to 121° C. and will autoignite at a desired temperature of approximately 177° C.

The autoignition devices of the prior art are not without their drawbacks. For example, autoignition compositions based on smokeless powder decompose when maintained at elevated temperatures for a long period and lose their effectiveness. Also, the use of lead compounds in autoignition compositions is generally avoided because of toxicity. Other problems may exist in inflator designs wherein the autoignition composition of the autoignition device may adversely affect the other ignitable compositions in the inflator device itself.

As such, a need has developed to provide improved autoignition devices or systems which overcome the drawbacks in the prior art.

The present invention responds to this need by using an autoignition composition which has its components divided by a separator with the melting point of the separator linked to the desired autoignition temperature of the system.

SUMMARY OF THE INVENTION

Accordingly, it is a first object of the present invention to provide an improved autoignition system which spontaneously combusts or autoignites at a desired temperature.

Another object of the present invention is the utilization of the inventive autoignition system in an inflator, particularly an air bag inflator.

A still further object of the present invention is the utilization of the inventive autoignition system in a method of inflating an inflator whereby the autoignition system autoignites at a select temperature.

Another object of the invention is the use of a separator which has a melting point linked to a desired autoignition temperature for the inventive autoignition system and its use in an inflator.

Other objects and advantages of the present invention will become apparent as a description thereof proceeds.

In satisfaction of the foregoing objects and advantages, in one embodiment, the present invention includes an autoignition system which produces a spontaneous combustion or autoignition at a select temperature. The system comprises a composition having at least one first component and at least one second component, each of which when combined together spontaneously combust or autoignite. The autoignition system also includes a separator interposed between the at least one first component and the at least one second component. The separator has a melting point generally corresponding to the autoignition select temperature so that when the system is subjected to the autoignition select temperature, the separator melts and the at least one first and second components are combined together for the spontaneous combustion or autoignition.

The separator can be any material which will melt at a temperature which is desirable for autoignition. The temperature range is typically between 60.5 and 199° C.

The separator can be a metallic, organic or inorganic material. More preferably, the separator is a eutectic metal alloy, more preferably a binary or ternary eutectic metal alloy containing one or more of bismuth, tin, lead, cadmium, indium, zinc and thallium.

The composition which spontaneously combusts can also be any known in the art. The type of composition will dictate which of the components are removed from each other by the separator so that autoignition occurs at the desired temperature.

In one mode, the at least one first and second components comprise a fuel and an oxidizer, respectively, with a separator disposed therebetween. The fuel can be a liquid or a solid fuel. Preferably, the oxidizer is a permanganate such as potassium permanganate.

In another mode, water can be utilized as the oxidizer with the fuel being an alkali metal or alkali metal-containing compound. In yet another mode, alkali metals or alkali metal-containing compounds as fuels can be combined with one of mercury or silver oxide, silver halide, chloroform and nitrated esters. A further mode can include metals as the fuel and halogens or halogen-containing compounds as the oxidizer.

An autoignition composition can also be used which requires a catalyst for the autoignition. In this mode, the catalyst would be kept separate from the other auto-ignition components by the separator. Upon mixing of the catalyst with the other autoignition components, auto-ignition is realized. Examples of this mode include potassium chlorate (oxidizer) and lactose (fuel) together and a separate sulfuric acid catalyst. Water can also be used as a catalyst in systems combining a fuel and sodium peroxide or the combination of magnesium and silver nitrate or an organohalide and a metal, e.g., hexachlorethane and zinc.

The inventive autoignition system is ideally adapted for use in an inflator or its method of inflating.

In another embodiment of the invention, a composition which normally will spontaneously combust is desensitized with water. This wet mixture is compartmentalized and combined with a venting device which can be the separator described above or a pressure sensitive burst disc. When using the separator having a specific melting point, reaching its melting point causes the separator to melt. The absence of the separator allows any evaporated water to exit or vent. Further evaporation of the water dries the wet autoignition composition. When the autoignition composition becomes dry, it then autoignites.

When using the pressure sensitive burst disc, an increase in temperature in the autoignition system causes the vapor pressure within the compartment to increase. The pressure sensitive burst disc is configured to burst at a predetermined vapor pressure. Upon bursting of the disc, the water evaporates from the compartment so that the remaining components can autoignite. The predetermined vapor pressure can be based upon a target autoignition temperature as would be within the skill of the art. This alternative embodiment can also be used in inflators or their method of inflating.

BRIEF DESCRIPTION OF DRAWINGS

Reference is now made to the drawings of the invention wherein.

DESCRIPTION OF THE PREFERRED EMBODIMENTS

Figure 1:
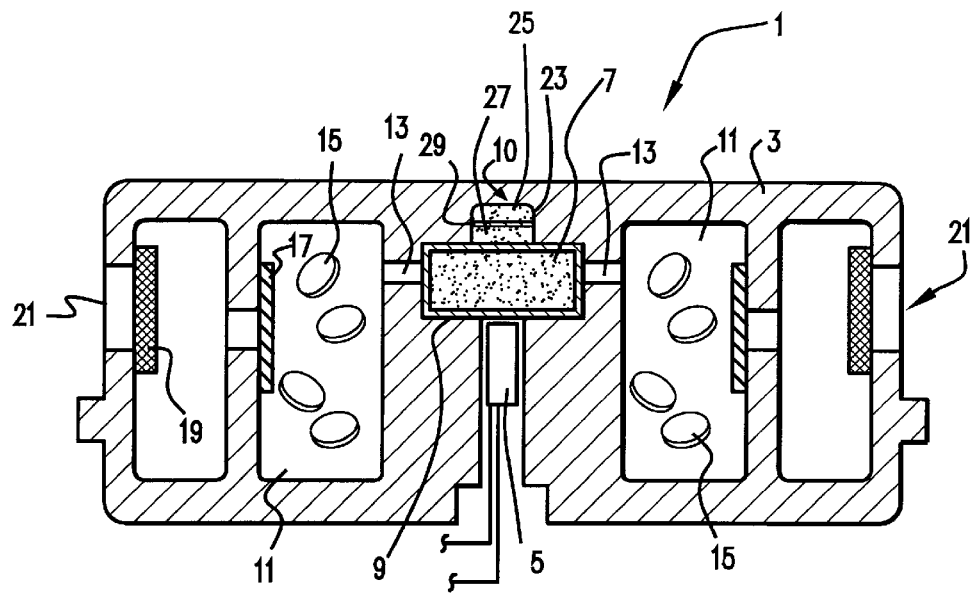
FIG. 1 is a schematic diagram of an exemplary inflator using the inventive autoignition system.

Referring to FIG. 1, the inventive autoignition system is generally designated by the reference numeral 10 and is employed with a conventional air bag inflator 1. The air bag inflator 1 includes an inflator housing 3 and an electric squib 5. As is well-known in the art, the electric squib 5 is actuated upon a vehicle collision to ignite the ignition agent 7 within the container 9. The container 9 is in communication with a gas generation chamber 11 via orifices 13. The gas generation chamber 11 includes gas-generating propellant 15 and burst discs 17.

In operation, upon ignition of the ignition agent 7, the combustion products thereof travel through the orifices 13 into the gas generation chamber 11 to ignite the gas generating propellant 15. The increase in pressure as a result of this combustion bursts the discs 17 to permit the inflating gas to pass through the filters 19 and out the exit ports 21 of the inflator housing 3.

The autoignition system 10 is positioned adjacent the ignition agent container 9. Upon autoignition, the ignition agent 7 is ignited to institute the chain of events described above.

In the embodiment depicted in FIG. 1, the auto-ignition system 10 is positioned within a cavity 23 in the inflator housing 3.

The inventive autoignition system comprises, in general, an autoignition composition which will spontaneously combust and a separator which interacts with one or more components of the composition to prevent the spontaneous combustion until a desired event occurs, e.g., the autoignition system reaches a target autoignition temperature.

The autoignition system is divided into at least first and second components, 25 and 27, respectively, by the separator 29. In the FIG. 1 embodiment, the components 25 and 27 are shown as granular materials. However, depending on the autoignition composition, components can be granules, particles, pellets, a liquid or any other known configurations for these types of autoignition composition components.

When the autoignition system reaches the target temperature, the separator ceases to become functional, i.e., reaches its melting point. Upon melting, the separator ceases to act as a barrier between the components of the autoignition composition. Thus, the autoignition composition becomes unitary to achieve the spontaneous combustion or autoignition.

The separator is designed to melt at a predetermined temperature to achieve the autoignition effect. The material of the separator can be selected to vary the melting point and the autoignition temperature. The specific application of the autoignition system may govern the selection of the autoignition temperature and the material of the separator. For example, if the auto-ignition system is located near the exterior of an automobile inflator, i.e., in close proximity to an igniting source such as an automobile fire, the auto-ignition system would then be heated faster than the interior parts and a relatively high melting point would be acceptable. A separator such as a tin foil which melts at 199° C. could be used. Alternatively, if the autoignition system were submerged or otherwise barricaded and/or insulated in the inflator at a significant standoff from an igniting source, a lower melting point separator could be used. For example, a binary bismuth-tin eutectic metal alloy having a melting point of 140° C. could be employed.

The selection of a metal alloy may also be a matter of the chemical compatibility with the self-combusting autoignition composition. For example, if the metal alloy were found to be reactive with any one of the components of the autoignition composition, it then might be necessary to passivate or coat the surface of the separator with a material inert to any one of the autoignition composition components. For example, a fluoride or oxide coating as is commonly used with stainless steels or aluminum could be used. Alternatively, the surface of the separator could have a paint or plastic film applied thereto.

While it is believed that any material having a melting point which would fall in the range of melting points adaptable for autoignition systems, particularly those in inflators can be used as part of the invention, Table 1 is representative of more preferred low melting point alloys.

TABLE 1

LIST OF LOW MELTING POINT ALLOYS

| | COMPOSITION, WT % | | | MELTING PT, |
|---|---|---|---|---|
| ID | Bismuth | Tin | Other | ° C. |
| Ternary Eutectic | 32.5 | 16.6 | 51.0 In | 60.5 |
| Wood's Metal | 50 | 12.5 | 25 Pb | 70 |
| | | | 12.5 Cd | |
| Binary Eutectic | 33.0 | | 67.0 In | 70 |
| Ternary Eutectic | 51.6 | | 40.2 Pb | 91.5 |
| | | | 8.2 Cd | |
| Ternary Eutectic | 52.6 | 15.5 | 32.0 Pb | 95.0 |
| Newton's Metal | 50.0 | 18.8 | 31.2 Pb | 97.0 |
| D'Arcet's Metal | 50.0 | 25.0 | 25.0 Pb | 98.0 |
| Onion's Metal | 50.0 | 20.0 | 30.0 Pb | 100.0 |
| Ternary Eutectic | 54.0 | 26.0 | 20.0 Cd | 102.5 |
| Rose's Metal | 50.0 | 22.0 | 28.0 Pb | 109.0 |
| Binary Eutectic | | 48.0 | 52.0 In | 117.0 |
| Binary Eutectic | | | 75.0 In | 120.0 |
| | | | 25.0 Cd | |
| Malotte's Metal | 46.1 | 34.2 | 19.7 Pb | 123.0 |
| Binary Eutectic | 55.5 | | 44.5 Pb | 124.0 |
| Ternary Eutectic | 56.0 | 40.0 | 4.0 Zn | 130.0 |
| Binary Eutectic | 58.0 | 42.0 | | 140.0 |
| Binary Eutectic | 60.0 | | 40.0 Cd | 140.0 |
| Eutectic Solder | | 63.0 | 37.0 Pb | 183.0 |
| Binary Eutectic | 48.0 | | 52.0 Tl | 185.0 |
| Soft solder | | 52.0 | 48.0 Pb | 192.0 |
| Binary Eutectic | | 91.0 | 9.0 Zn | 198.0 |
| Tin Foil | | 92.0 | 8.0 Zn | 199.0 |
| White Metal | | 92.0 | 8.0 Sb | 199.0 |

The separator can also be a non-metallic material such as an inorganic or organic compound. Many of these types of materials have melting points (including decomposition temperatures) in a range of 120–200° C. The Handbook of Chemistry and Physics lists about 366 inorganic compounds (salts, double salts, hydrates, addition compounds, etc.) and 2769 organic compounds falling in this temperature range. Although the toxicity or rareness of some of these compounds may make them impractical for use, it is anticipated that many inorganic and organic compounds have utility as a separator.

Of the organic compounds, polymers, both thermoplastic and thermosetting, could also be used as a separator. The Handbook of Plastics and Elastomers, Chas. A. Harper (Ed.), McGraw-Hill (1975) lists 62 resins ranging from those having a melting point of 107° C. for asbestos-filled acrylonitrile copolymers to glass-filled polysiloxanes having a melting temperature of 399° C. Nitrile, neoprene, and isoprene elastomers are also deemed acceptable for separator melting temperatures greater than 107° C. Natural rubbers would also fall within a class of material for the separator.

The division of the components of the autoignition composition by the separator depends on the autoignition composition makeup.

In one mode, when using a fuel and an oxidizer, the fuel and oxidizer are kept apart by the separator. When the fuel and oxidizer are solid materials, the autoignition system would be similar to that depicted in FIG. 1 wherein the fuel is identified by reference numeral 27 with the oxidizer represented by reference numeral 25.

Figure 2A:
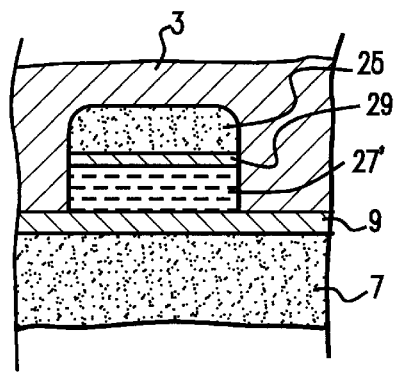
FIGS. 2A and 2B are schematic illustrations of different modes of the inventive autoignition system.

FIG. 2A shows the autoignition system 10 of FIG. 1 enlarged and with the use of a liquid fuel 27' in combination with the oxidizer 25.

It should be understood that any known composition which will spontaneously combust or autoignite when the components of the composition are mixed together under the proper conditions can be employed as part of the inventive autoignition system, both as solid, liquids or solid/liquids mixtures.

Exemplary of systems wherein the fuel and oxidizer are kept separate are permanganate systems and systems wherein water is used as the oxidizer or reactant.

Permanganate systems are known in the art. A preferred choice of this system is the combination of glycerol and potassium permanganate. Of course, glycerol can be replaced by other substances such as ethylene glycol, methyl glycol, monochlorohydrin, triethanol amine, acetaldehyde and benzaldehyde, erythritol and mannitol. Of this group, the erythritol and mannitol are high melting solids. The others are liquids.

Other permanganates besides potassium permanganates can be used, e.g., calcium permanganate which is more reactive with glycerol than potassium permanganate but is not as readily available.

The permanganate systems can also be catalyzed with a sulfuric acid. In this mode, the sulfuric acid would be stored with the permanganate in the autoignition system. One way to store the acid safely with the permanganate is as an acid sulfate, such as ammonium bisulfate, $NH_4HSO_4$. This compounds melts at 146.9° C., which falls within a desired range for autoignition systems in inflators. This compound subsequently decomposes into ammonium sulfate and sulfuric acid, i.e., $2\ NH_4HSO_4 \rightarrow (NH_4)_2SO_4(c) + H_2SO_4(l)$. Ammonium sulfate is a solid, melting at 235° C., and sulfuric acid is a liquid, boiling at 330° C.

As stated above, water can also be used as an oxidizer. As is well known, alkali metals react explosively when combined with water. In this system, the water would be housed on one side of the separator with the alkali metal on the other. The reaction can be intensified if the water is thickened, as with starch paste, or if the alkali metal is finely divided, or if the reaction temperature is above 40° C. The fact that water freezes is immaterial.

When using systems that employ a liquid, care should be taken to assure that the separator has sufficient strength to withstand the vapor pressure of the liquid at temperatures below the melting point of the separator. If the separator has insufficient strength, it may prematurely fail as a result of the increase in the vapor pressure of the liquid due to temperature rise and cause premature activation of the inflator.

When water is used as the reactant/oxidizer, it can also be stored as a hydrate, e.g., Epsom salt, $MgSO_4 \cdot 7H_2O$. When dried to the dihydrate, it releases a single water of hydration at 120° C. which is in the temperature range of interest for the autoignition system for inflators. Note that when using a hydrated water compound, the separator does not have to be as robust or strong to store this salt.

Other fuels/oxidizer mixtures which would be kept apart by the separator include alkali metals and alkali metal-containing compounds or alloys as fuels and one of mercury oxide, silver oxide and the well known nitrated esters or ethylene glycol oxidizers.

All metals can also act as a fuel when the oxidizer is a halogen or a halogen-containing compound, e.g. inorganic and organic halides. Alkali metals will also detonate on contact with silver halide as well as chloroform.

Figure 2B:
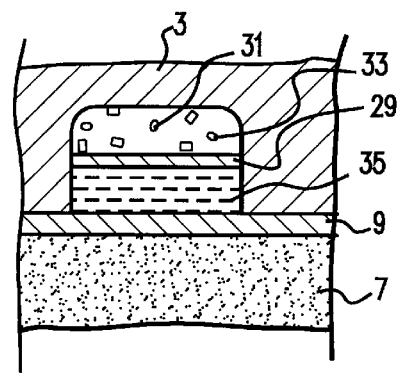

The autoignition system can also function using a fuel and an oxidizer which are ignited by the presence of a catalyst. Referring to FIG. 2B, an autoignition system of this type is illustrated wherein the fuel, represented by circles and identified by reference numeral 31, is combined with the oxidizer represented by squares and identified by reference numeral 33 as a mixture. The mixture is kept apart from the catalyst 35 by the separator 29. Upon melting of the separator 29, the catalyst mixes with the oxidizer and fuel to initiate autoignition, heating through the container wall of the ignition agent 7, and igniting the ignition agent. The fuel and oxidizer, 31 and 33, can be potassium chlorate and lactose with are normally stable when mixed together. However, when subjected to concentrated sulfuric acid as the catalyst 35, they will ignite spontaneously. This catalytic effect can be extended to mixtures of other chlorates and other carbohydrates and possibly to dilute acid. Again, the acid is stored as a catalyst on one side of the separator so as not to contact the chlorate/carbohydrate mixture until the separator melts.

Water can also be used as the catalyst 35. In this mode, the oxidizer 33 can be sodium peroxide with the fuel 31 being aluminum, magnesium and organic materials such as sawdust or paper, hexamethylene tetramine or the like. These mixtures are not spontaneously combustible when dry. However, when they are moistened, spontaneous combustion occurs. Consequently, the water would be stored on one side of the partition as 35, see FIG. 2B with the sodium peroxide ($Na_2O_2$) as the oxidizer 31 and the fuel as 33. The water can be stored as a hydrate as described above.

Alternative fuel and oxidizer mixtures include magnesium as a fuel and silver nitrate as the oxidizer.

A further embodiment would include organohalides as a stable mixture with a metal. Again, when dry, these mixtures do not autoignite. The organohalide would be represented by reference numeral 31 with the metal represented by reference numeral 31. A preferred example of this system would be zinc and hexachloroethane.

When using the magnesium and silver nitrate system, as an alternative, the silver nitrate could be formed into a solution or merely moistened. The solution or moistened silver nitrate is then kept apart from the magnesium by the separator. In this system, the fuel and oxidizer are kept separate, similar to that shown in FIGS. 1 and 2A.

Table 2 provides a representative list of the autoignition compositions described above.

TABLE 2

LIST OF AUTOIGNITION COMPOSITIONS

| COMPOSITION, WT % FUEL | OXIDIZER | REMARKS |
| --- | --- | --- |
| Glycerol | $KMnO_4$ | Liquids |
| Ethylene Glyocol | " | " |
| Methyl Glycol | " | " |
| Monochlorohydrin | " | " |
| Triethanol Amine | " | " |
| Acetaldehyde | " | " |
| Benzaldehyde | " | " |
| Erythritol | " | Both Solids |
| Mannitol | " | " |
| Alkali Metals | Water | The alloys are also hypergolic |
| NaH | " | |
| $NaNH_2$ | " | |
| $LiAlH_4$ | " | |
| Alkali Metals | HgO | The alloys are also hypergolic |
| " | $Ag_2O$ | The alloys are also hypergolic |
| " | $CH_4NO_3$ | The alloys are also hypergolic |
| " | $C_2H_5NO_3$ | The alloys are also hypergolic |
| " | AgCl | Detonates |

TABLE 2-continued

LIST OF AUTOIGNITION COMPOSITIONS

| COMPOSITION, WT % FUEL | OXIDIZER | REMARKS |
| --- | --- | --- |
| All Metals | Chloroform All Halogens | " |
| Al | $Na_2O_2$ | Ignited Spontaneously by $H_2O$ |
| Sawdust | " | Ignited Spontaneously by $H_2O$ |
| Paper | " | Ignited Spontaneously by $H_2O$ |
| Hexamethylene-tetramine | " | Ignited Spontaneously by $H_2O$ |
| Sugar | $KClO_3$ | Ignited Spontaneously by $H_2SO_4$ |
| Mg | $AgNO_3$ | Ignited Spontaneously by $H_2O$ |
| Zn | $C_2Cl_6$ | Ignited Spontaneously by $H_2O$ |
| P (red) | $KClO_3$ | Stabilized By Water |

In another aspect of the invention, an autoignition composition is used in a desensitized state prior to autoignition. In this system, a mixture of components is insensitive to ignition by mechanical stimuli when wet. However, when dry, the mixtures are extremely sensitive. In other words, when these mixtures become dry, the friction associated with motion during drying can cause spontaneous combustion.

In this embodiment, a separator as shown in FIG. 1 is not used to separate the fuel and oxidizer mixture. Rather, referring to FIG. 3, a venting device 29' is used to seal the interior of the compartment 37 which contains the oxidizer 31, the fuel 33 and water 39, represented as circles, squares and triangles, respectively. The venting device 29' can be the same material used for the separator 29 in FIGS. 1, 2A and 2B, or it can be a pressure sensitive burst disc.

In operation, the compartment contains the wet mixture of the oxidizer 31, fuel 33 and water 39. When heated, the water evaporates and causes the venting device 29' to lose its sealing function, either by disc rupture or separator melting so that the evaporated water can vent from the compartment via the orifice 41. The orifice 41 can be in communication with another compartment of the inflator of FIG. 1 such as the gas generator compartment 11, the orifice 13 or even the atmosphere. When the water is vented to the gas generator chamber, due to its large size in contrast to the compartment 37, the inflator is unaffected by the moisture from the autoignition composition.

With the water being vented from the compartment 37, the mixture of fuel and oxidizer, 33 and 31, respectively, dries. The dry mixture is subsequently ignited by friction associated with slight motion accompanying the drying.

In the preferred mode, the wet mixture is a combination of potassium chlorate as the oxidizer and red phosphorous as the fuel. Of course, other known combinations of fuel and oxidizer which can be desensitized with water or an equivalent can be utilized in this embodiment of the invention.

Figure 3:
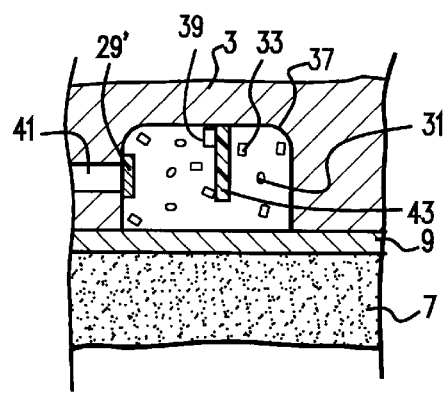
FIG. 3 is a schematic illustration of a second embodiment of the inventive autoignition system.

Increasing the abrasiveness of the walls of the compartment 37 in contact with the mixture can intensify friction and therefore aid in ignition. Also, the motion needed for friction can be amplified by adding a partition 43 to the compartment. The partition can be the same material as the compartment walls or, as shown in FIG. 3, a different material so as to have a different coefficient of thermal expansion. The effect of the partition is to retain all or part of the mixture between it and the compartment walls. High temperature causes relative motion between the mixture and wall surfaces, which in turn creates friction and subsequent ignition. The compartment walls and/or the partition could also be abrasive to increase friction. If the compartment is made of a metal, then a good choice for the partition is a polymer since there is typically a great difference in coefficients of thermal expansion between these two types of materials.

The friction can also be intensified by employing a granulating grinding material, such as frit, with the wet potassium chlorate-red phosphorous mixture. Increasing the number of frictions sites with the friction material promotes ignition of the dried mixture.

As stated above, the venting device 29 can also be a conventional burst disc which is sized to rupture based on the rising vapor pressure of the interior of the compartment 37 as a result of water evaporation. The burst disc can be sized so that it bursts at a given temperature which is directly related to the vapor pressure within the compartment 37 so that venting and spontaneous combustion occur at the desired temperature.

In the method aspect of the invention, referring to FIG. 1, the autoignition system 10 is capable of igniting the ignition agent 7 when the separator 29 reaches its melting point and autoignition of the components 25 and 27 occurs. With this autoignition, the container 9 is locally heated to the autoignition temperature of the ignition agent 7, thereby igniting it and the gas generating propellent 15. A similar sequence of events occurs in the embodiment depicted in FIG. 3, once the moisture is vented from the compartment 37.

Again, the autoignition system is adaptable for any device or method which requires autoignition based on a defined temperature. Although the selected temperature can vary depending on the application, the temperature range is best suited between about 60 and 200° C. for air bag inflator use. The temperature may vary from this if other types of inflating devices are used.

As such, an invention has been disclosed in terms of preferred embodiments thereof which fulfill each and every one of the objects of the present invention as set forth above and provides a new and improved autoignition system for use in an inflator and its method of inflating.

Various changes, modifications and alterations from the teachings of the present invention can be made by those skilled in the art without departing from its intended spirit and scope thereof. Accordingly, the invention is only to be limited by the appended claims.

What is claimed is:

1. A system producing an autoignition at a select temperature comprising:
    (a) a composition having at least one first component and at least one second component which when combined together autoignite; and
    (b) a separator interposed between the at least one first component and the at least one second component, the separator having a melting point generally corresponding to the autoignition select temperature, so that when the system is subjected to the autoignition select temperature, the separator melts and the at least one first and the at least second components are combined for the autoignition, wherein the melting point of the separator ranges between about 60.5° C. and 199° C.

2. A system producing an autoignition at a select temperature comprising:
    (a) a composition having at least one first component and at least one second component which when combined together autoignite; and
    (b) a separator interposed between the at least one first component and the at least one second component, the separator having a melting point generally corresponding to the autoignition select temperature, so that when the system is subjected to the autoignition select temperature, the separator melts and the at least one first and the at least second components are combined for the autoignition, the separator being made of an eutectic metal alloy.

3. The system of claim 2 wherein one metal of the eutectic metal alloy is bismuth, tin, lead, cadmium, indium, zinc or thallium.

4. The system of claim 2 wherein the eutectic metal alloy comprises about 88% by weight bismuth and 42% by weight tin.

5. The system of claim 1 wherein the melting point of the separator ranges between about 60.5° C. and 199° C.

6. The system of claim 1 wherein the separator is one of an inorganic or organic compound.

7. The system of claim 6 wherein the separator is an organic compound and is one of a thermosetting polymer, a thermoplastic polymer, and an elastomer.

8. The system of claim 6 wherein the melting point of the separator ranges between about 60.5° C. and 199° C.

9. The system of claim 6 wherein the at least one first component is a fuel and the at least one second component is an oxidizer.

10. The system of claim 9 wherein the fuel is selected from the group of glycerol, ethylene glycol, methyl glycol, monochlorodydrin, triethanol anine, acetaldehyde, benzaldehyde, erythritol, mannitol and combinations thereof.

11. The system of claim 9 wherein the oxidizer is a permanganate.

12. The system of claim 10 wherein the oxidizer is a permanganate.

13. The system of claim 9 further comprising a catalyst as another second component.

14. The system of claim 12 further comprising a catalyst as another second component.

15. The system of claim 14 wherein the catalyst is an acid.

16. The system of claim 15 wherein the acid is a sulfuric acid.

17. The system of claim 16 wherein the sulfuric acid is in the form of an acid sulfate.

18. The system of claim 17 wherein the acid sulfate is ammonium bisulfate.

19. The system of claim 1 wherein the at least one first component comprises a chlorate and another first component is a carbohydrate and the second component is an acid.

20. The system of claim 19 wherein the chlorate is potassium chlorate, the carbohydrate is lactose and the acid is sulfuric acid.

21. The system of claim 1 wherein the at least one first component is an alkali metal or an alkali metal-containing compound and the at least one second component is water.

22. The system of claim 21 wherein the water is in hydrate form.

23. The system of claim 21 wherein the alkali metal-containing compounds are selected from the group consisting of sodium hydride, sodium amide and lithium aluminum hydride.

24. The system of claim 1 wherein the at least first component is an alkali metal, an alkali metal-containing compound or an alkali metal alloy and the at least one second component is one of an oxide of mercury, an oxide of silver, a nitrated ester, chloroform and silver halide.

25. The system of claim 24 wherein the at least one second component is a nitrated ester selected from the group consisting of diethylene glycol dinitrate and triethylene glycol dinitrate.

26. The system of claim 1 wherein the at least one first component is a metal and the at least one second component is a halogen or halogen-containing compound.

27. The system of claim 1 wherein the at least one first component comprises as sodium peroxide and a fuel, the sodium peroxide and fuel combined in dry form, and the at least one second component is water.

28. The system of claim 27 wherein the water is in hydrate form.

29. The system of claim 27 wherein the fuel is selected from the group of aluminum, magnesium, organic matter, and hexamethylene tetramine.

30. The system of claim 1 wherein the at least one first component comprises two components as one of a combination of magnesium and silver nitrate and a combination of a metal and an organohalide and the at least one second component is water.

31. The system of claim 30 wherein the organohalide is hexachloroethane and the metal is zinc.

32. The system of claim 1 wherein the separator is coated on at least a portion of a surface thereof to avoid reaction with at least one of the at least one first component and the at least one second component.

33. The system of claim 2 wherein the separator is coated on at least a portion of a surface thereof to avoid reaction with at least one of the at least one first component and the at least one second component.

34. The system of claim 6 wherein the separator is coated on at least a portion of a surface thereof to avoid reaction with at least one of the at least one first component and the at least one second component.

* * * * *